United States Patent [19]

Samizo

[11] 3,919,598

[45] Nov. 11, 1975

[54] DEFLECTION BLANKING CIRCUIT FOR USE IN A CATHODE RAY OSCILLOSCOPE

[75] Inventor: Hiroshi Samizo, Tokyo, Japan

[73] Assignee: Iwatsu Electric Co., Ltd., Tokyo, Japan

[22] Filed: Aug. 17, 1973

[21] Appl. No.: 389,210

[30] Foreign Application Priority Data

Oct. 9, 1972 Japan .............................. 47-101467

[52] U.S. Cl. .................................. 315/385; 315/384

[51] Int. Cl.[2] .......................................... H01J 29/52

[58] Field of Search .......... 315/20, 22, 30, 384, 385

[56] References Cited

UNITED STATES PATENTS 3,562,557 2/1971 Gates .................................... 315/18

*Primary Examiner*—Maynard R. Wilbur

*Assistant Examiner*—T. M. Blum

*Attorney, Agent, or Firm*—Oblon, Fisher, Spivak, McClelland & Maier

[57] ABSTRACT

In a deflection blanking circuit which accomplishes blanking or unblanking of an electron beam emitted from a cathode on a fluorescent screen by controlling the voltage of a deflection blanking plate of a cathode ray tube incorporated in a cathode ray oscilloscope, there are provided a first deflection blanking plate connected to a reference D.C. voltage source and a second deflection blanking plate spaced apart and in parallel with the first deflection blanking plate. The first blanking plate is connected to an output terminal of an amplifier which amplifies an input voltage so as to apply unblanking pulses thereto, and a diode is connected across both of the deflection blanking plates.

11 Claims, 9 Drawing Figures

DEFLECTION BLANKING CIRCUIT FOR USE IN A CATHODE RAY OSCILLOSCOPE

BACKGROUND OF THE INVENTION

1. Field of the Invention

The present invention relates generally to electron beam display devices, and in particular to a deflection blanking circuit for use with such electron beam display devices.

2. Description of the Prior Art

In an electron beam display device, such as a cathode ray tube used in a cathode ray oscilloscope, it is conventional to provide a deflection blanking circuit which may accomplish blanking of the electron beam emitted from the cathode during the time of its return trace on the fluorescent screen or unblanking of it during the horizontal sweep periods. The deflection blanking circuit comprises a pair of spaced apart parallel deflection plates which face each other on opposite sides of the electron beam path. One plate of the two deflection blanking plates is connected to a D.C. voltage bias source. The other plate of the two deflection blanking plates is connected to an output terminal of an amplifier which amplifies an input voltage so as to apply a train of unblanking pulses thereto. In the absence of an unblanking pulse, one plate of the pair of deflection plates deflects the beam to such an extent that it does not reach the screen. A positive unblanking pulse having a value equal to the voltage difference between the two deflecttion plates will decrease the deflection produced by the deflection plates so that the electron beam continues to strike the screen in timed relation to the feeding of sweep voltage pulses to the horizontal deflection plates of the cahtode ray tube. As a result of the above, the screen is unblanked during the horizontal sweep periods of the sweep pulses. The amplifier connected to one platee of the two deflection plates ordinarily includes a transistor for amplifying and a variable resistor for adjusting the brightness of the light spot produced by the electron beam impinging upon the fluorescent screen. The other defection plate is maintained at a required D.C. voltage by a reference voltage diode which is generally a zener diode. However, while somewhat satisfactory, with the prior art deflection blanking circuits, the variable resistor in the amplifier had to be manually adjusted so that a maximum brightness could be obtained on the screen after assembling the deflection blanking circuit. Furthermore, maximum operating conditions were prevented in that the output voltage of the amplifier would not become exactly equal to the reference voltage applied to one plate of the two deflection blanking plates due to drifting of the input voltage, drifting of the amplification of the amplifier, or variation in the characteristics of the zener diode under temperature changes. Accordingly, a maximum brightness of the light spot on the screen could not be obtained.

In addition to the above mentioned conventional deflection blanking circuits, there has been proposed a prior art deflection blanking circuit which included an amplifier not having a variable resistor for manually adjusting brightness of the light spot on the screen. While again somewhat satisfactory, here problems arose in that a delay time would occur in responding to an input signal voltage because an adequate time was required to saturate the transistors in the amplifier. Moreover, the amplifier circuit became very complicated.

SUMMARY OF THE INVENTION

Accordingly, one object of the present invention is to provide a new and improved unique deflection circuit which produces, without any manual operations, a maximum brightness of the light spot provided by an electron beam bombarding upon the fluorescent screen in a display device.

Another object of the present invention is to provide a new and improved deflection blanking circuit wherein the output voltage of the amplifier thereof is made equal to the reference voltage applied to one of the deflection blanking plates without any drift occuring.

Still another object of the present invention is to provide a new and improved unique deflection blanking circuit which has no delay in responding to an input voltage signal.

Yet one other object of the present invention is to provide a new and improved unique deflection blanking circuit which is compact and of simple construction.

Briefly stated in accordance with the present invention, the foregoing and other objects and advantages are provided in one aspect in a deflection blanking circuit which makes blanking or unblanking of an electron beam emitted from the cathode on a fluorescent screen by controling the voltage of the deflection blanking plates within a cathode ray tube incorporated in cathode ray oscilloscope, there are provided a first deflection blanking plate connected to a reference D.C. bias voltage source, a second deflection blanking plate spaced apart and in parallel with the first deflection blanking plate. The first deflection blanking plate is connected to an output terminal of an amplifier which amplifies an input voltage so as to apply unblanking pulses thereto. A diode is connected across both of the deflection blanking plates.

BRIEF DESCRIPTION OF THE DRAWINGS

The invention can be more fully understood from the following description when taken in conjunction with the accompanying drawings in which.

FIGS. *6a*, *6b*, *6c* and *6d* show a part of the circuit of the deflection blanking circuit of the present invention which is for improving the relation between an output voltage of the amplifier and a reference D.C. voltage.

DETAILED DESCRIPTION OF THE PREFERRED EMBODIMENTS

Figures 1, 2, 3, 4:
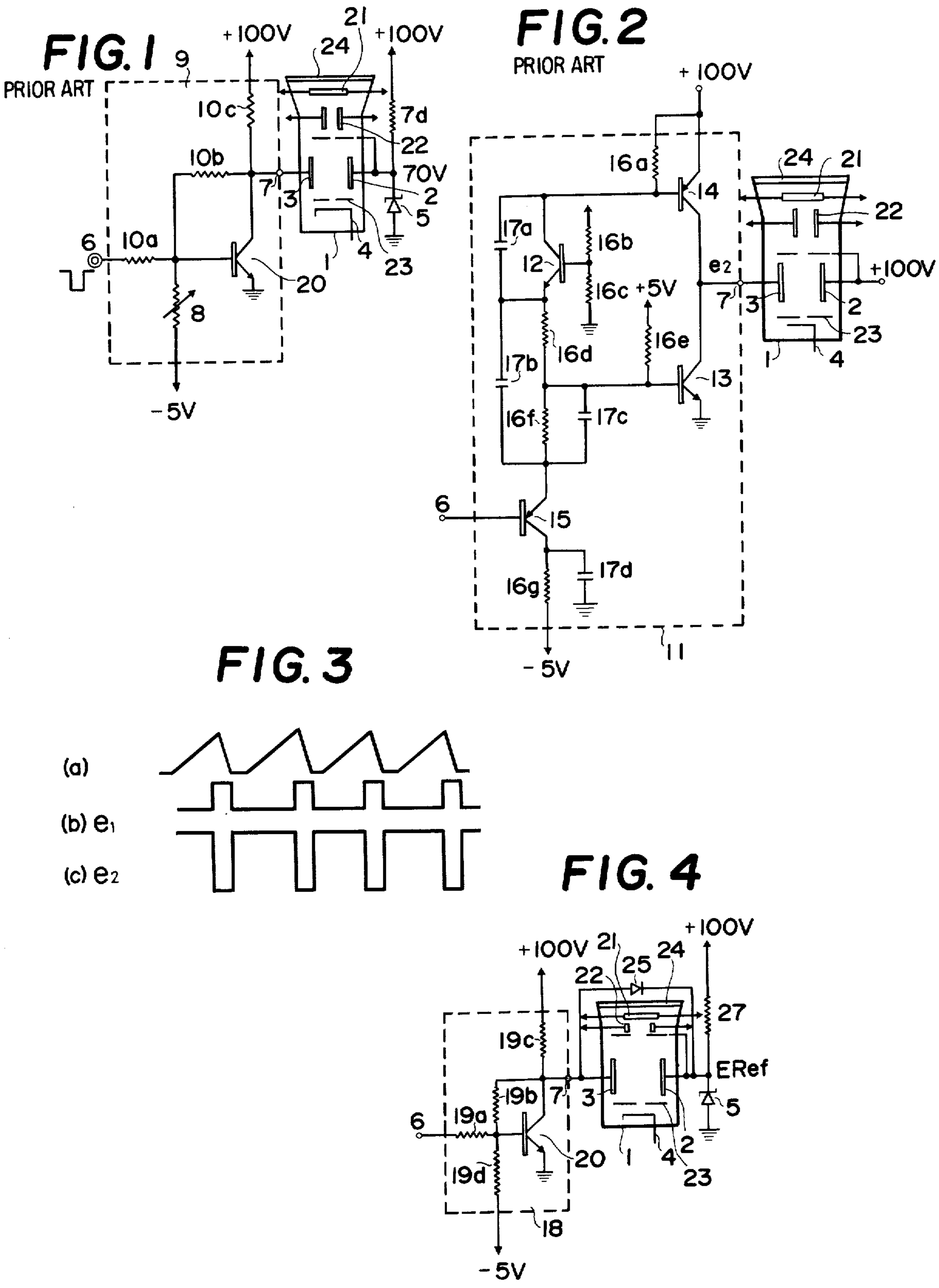
FIGS. 1 and 2 respectively, show examples of prior art deflection blanking circuits.
FIG. 3 shows waveforms to explain the operation of the deflection blanking circuit in accordance with the present invention.
FIGS. 4 and 5 respectively, show examples of deflection blanking circuits in accordance with the present invention.

Referring now to the drawings wherein like reference numerals designate identical, or corresponding parts throughout the several views, and more particularly to FIGS. 1 and 2 thereof, wherein examples of conventional deflection blanking circuits are respectively shown as including a pair of deflection blanking plates 2, 3 within a cathode ray tube 1 of an oscilloscope. As shown in FIG. 1, the deflection blanking plate 2 is grounded through a zener diode 5 and biased to 70 volts. The deflection blanking plate 3 is connected to an output terminal 7 of an amplifier 9. A variable resistor 8 for adjusting the brightness intensity of the light spot on the oscilloscope screen is provided within the amplifier 9 such that the value of the output voltage at the output terminal 7 may reach plus 70 volts, when the value of an input voltage applied to the input terminal 6 is at a minimum.

Furthermore, as shown in FIG. 2, the deflection blanking plate 2 is connected to a D.C. power supply and biased to plus 100 volts. The other deflection blanking plate 3 is connected to an output terminal of an amplifier 11. The amplifier 11 comprises NPN transistors 12, 13, PNP transistors 14, 15, resistors **16*a*–16*g* and capacitors 17*a*–17*d*. The group of resistors 16*a*–16*g* are provided within the amplifier 11 so that the transistor 14 may become in the "off" state when the transistor 13 becomes in the "on" state. Also, the transistor 14 may become in the "on" state when the transistor 13** becomes in the "off" state. Accordingly, the value of the output voltage of the amplifier varies between 0 volts and 100 volts.

As mentioned above, in the conventional deflection blanking circuit there is an inconvenience in that the variable resistor in the amplifier must be manually adjusted after assembling the deflection blanking circuit. In the case of the deflection blanking circuit as shown in FIG. 1 there are defects in that the maximum brightness of the light spot cannot be obtained due to drifting of the amplifier and the like. Furthermore, in the case of the deflection blanking circuit as shown in FIG. 2 there are defects in that a delay time in responding to the input signal voltage occurs and the amplifier circuit is complicated.

FIG. 4 shows a preferred embodiment of the deflection blanking circuit according to the present invention. In FIG. 4, an amplifier 18 comprises resistors **19*a*–19*d* and a transistor 20. An output terminal of the amplifier 18 is connected to a deflection blanking plate 3 of a cathode ray tube 1. The cathode ray tube 1 has horizontal deflection plates 21, vertical deflection plates 22, a control grid 23, a cathode 4 and a fluorescent screen 24. A deflection blanking plate 2 spaced apart from and in parallel with the deflection blanking plate 3 is grounded through a zener diode 5. A diode 25 is connected across the deflection blanking plates 2, 3. A reference voltage E Ref, predetermined by the zener diode 5 and a resistor 27 connected in series, is applied to the deflection blanking plate 2. One end of the resistor 27 is connected to a plus 100 volt D.C. power supply. The respective values of the resistors 19*a*–19*d* in the amplifier 18 are determined so that the output voltage of the amplifier 18 may be higher than that of the reference D.C. voltage applied to the deflection blanking plate 2 when an input voltage of the amplifier 18 is at a minimum when the diode 25 is not connected across the deflection blanking plates 2, 3**.

The operation of a specific example of the deflection blanking circuit of the present invention may be more readily understood with reference to the graph shown in FIG. 3.

When an input voltage *e*1, as shown in FIG. 3*b* is applied to an input terminal 6 of the amplifier 18, an output voltage *e*2, as shown in FIG. 3*c*, is obtained at an output terminal 7 of the amplifier 18. The output voltage *e*2 provides a series of positive unblanking pulses in timed relation to the feeding of the sweep voltage which are applied to the deflection blanking plate 3 during the horizontal sweep periods. The output voltage *e*2 provides a series of negative blanking pulses which are applied to the deflection blanking plate 3 during the time of the electron beam return trace on the fluorescent screen 24. As the voltage of the deflection blanking plate 3 varies in response to the output voltage of the amplifier 18, the electron beam emitted by the cathode 4 is deflected. In other words, the output voltage of the output terminal 7 has a high level during the horizontal sweep periods, as shown in FIG. 3*c*. When the maximum output voltage of the amplifier 18 seeks to become higher than that of the reference voltage E Ref applied to the deflection blanking plate 2, the output voltage of the amplifier 18 is clipped at the level of the reference voltage, e.g., plus 0.6 volts. Accordingly, the respective voltages of the deflection blanking plates 2, 3 automaticaally becomes equal. As a result thereof, the highest brightness can be obtained on the screen 24. Moreover, when a sweeping operation of the electron beam ends, the output voltage of the amplifier 18 becomes a low level so that the unblanking of the screen 24 can be accomplished.

Figure 5:
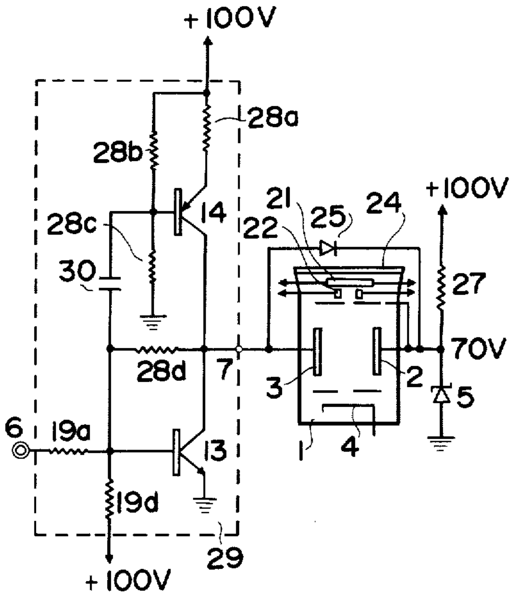

FIG. 5 shows another alternative and preferred embodiment of the deflection blanking circuit of the present invention. As shown in FIG. 5, an amplifier 29 is provided of the complementary and symmetrical type and includes a NPN transistor 13, a PNP transistor 14, resistors **19*a*, 19*d*, 28*a*–28*d* and a capacitor 30. An output terminal 7 of the amplifier 29 is connected the deflection blanking plate 3 as in the embodiment of the deflection blanking circuit shown in FIG. 4. The operation of the deflection blanking circuit shown in FIG. 5 is the same as that of the embodiment of the deflection blanking circuit shown in FIG. 4. In this embodiment, a delay time cannot occur because the transistor 14** is never saturated.

In the above-mentioned examples of the deflection blanking circuit according to the present invention, a voltage drop appears between the deflection blanking plates through the diode 25 when biased in the forward direction, and practically no problems can occur.

Figure 6A:
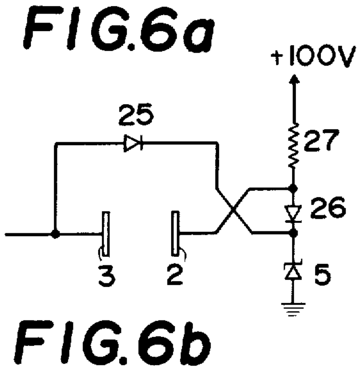
Figure 6B:
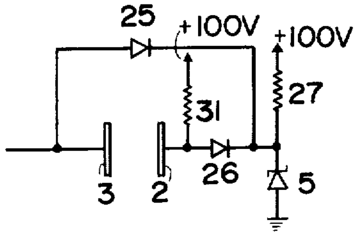
Figures 6C, 6D:
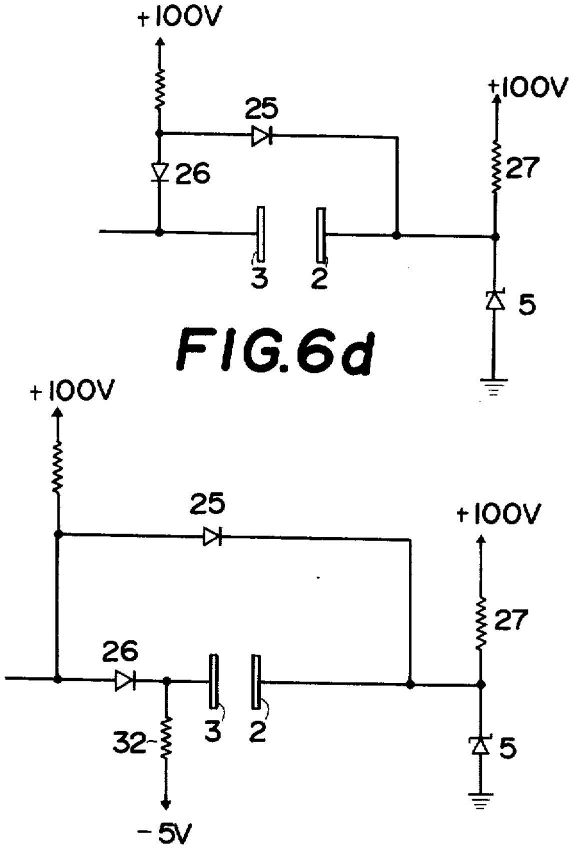

Furthermore any problems that could occur can be eliminated by providing a diode 26 which is connected as shown in FIGS. **6*a*, 6*b***, 6*c* and **6*d*. That is, according to FIGS. 6*a***, 6*b*, 6*c* and **6*d* the diode 26 is provided between one terminal of the resistor 27 and the cathode of the zener diode 5, between the deflection blanking plate 2 and the cathode of the zener diode 5 or between an anode of the diode 25 and one plate of two deflection blanking plates. Thus, the output voltage of the output terminal 7** may be accurately made equal to that of the reference voltage. Also, it should be understood that the deflection blanking circuit of the present invention is applicable to other amplifiers instead of the above-mentioned amplifiers for the preferred embodiments.

As mentioned above, according to the deflection blanking circuit of the present invention the maximum output voltage of the amplifier is always made equal to a reference voltage, so that the voltage between a pair of deflection blanking plates is maintained at a constant value in spite of there being any drift of an input voltage, of an amplifier or a characteristic difference depending upon respective elements such as transistors or diodes. As a result thereof, it should now be apparent that with the present invention maximum brightness can always be obtained on the screen. Furthermore, with the present invention the average voltage of the deflection blanking plate can be predetermined voluntarily.

It should be understood that details of the deflection blanking circuit described above may be varied by those skilled in the art in an obvious manner without departing from the spirit of the present invention. Therefore the preceding detailed description of the preferred embodiments of the present invention is not intended to limit the scope of the invention as defined by the following claims.

What is claimed as new and desired to be secured by letters Patent of the United States is:

1. A deflection blanking circuit for a cathode ray tube having a cathode, horizontal plates and vertical plates comprising:

means for supplying reference D.C. bias voltage;

a first deflection blanking plate for deflecting an electron beam impinging upon a screen of the tube and connected to the D.C. bias voltage source, a second deflection blanking plate spaced apart and in parallel with said first deflection blanking plate;

means for amplifying an input voltage and applying a series of unblanking pulses from an output thereof to said second plate to said two deflection blanking plates; and, a diode connected across said deflection blanking plates for clipping the output of said amplifier at the level of said reference voltage.

2. In the deflection blanking circuit according to claim 1, said reference D.C. bias voltage source comprises:

a D.C. power source;

a resistor, one terminal of which is connected to said D.C. power source;

a zener diode connected in series with said resistor at one terminal; and, wherein the other terminal of said zener diode is grounded and the connection between said resistor and zener diode is connected to one of said deflection blanking plates.

3. In the deflection blanking circuit according to claim 1, said amplifier comprises:

a transistor, an emitter of which is grounded;

a first resistor, one terminal of which is connected to a D.C. power supply;

a second resistor connected across a collector and base of said transistor;

a third resistor, which is connected to an input terminal and said base of said transistor;

a fourth resistor, which is connected to a D.C. power supply and said base of said transistor; and, wherein said collector of said transistor is connected to one plate of said two deflection blanking plates.

4. The deflection blanking circuit according to claim 1, wherein said amplifier is of a complementary and symmetrical type.

5. In a deflection blanking circuit having a cathode, vertical deflection plates and horizontal deflection plates, the improvement comprises:

a first deflection blanking plate for deflecting an electron beam emitted from said cathode of the tube;

a second deflection blanking plate spaced apart and in parallel with said first deflection blanking plate;

a D.C. bias voltage source comprising a first resistor; one terminal of which is connected to a D.C. power supply; and a zener diode, an anode of which is grounded;

a first diode connected across one plate of said two deflection blanking plates and a cathode of said zener diode;

means for compensating for a voltage drop through said first diode which is provided between a cathode of said zener diode and said second deflection blanking plate or between an anode of said first diode and said first deflection blanking plate; and, an amplifier for applying an unblanking pulse to said first deflection blanking plate.

6. The deflection blanking circuit according to claim 5, wherein said compensating means comprises a second diode, an anode and a cathode of which are connected respectively to said second deflection blanking plate and a cathode of said zener diode.

7. The deflection blanking circuit according to claim 5, wherein said compensating means comprises:

a second diode connected between said second deflection blanking plate and a cathode of said zener diode; and, a resistor which is connected to a D.C. power supply and said second deflection blanking plate.

8. The deflection blanking circuit according to claim 5, wherein said compensating means comprises:

a second diode connected between an anode of said first diode and said first deflection blanking plate; and, a second resistor, which is connected to a D.C. power supply and an anode of said second diode.

9. The deflection blanking circuit according to claim 5 wherein said compensating means comprises:

a second diode connected between said second deflection blanking plate and a cathode of said zener diode; and, a second resistor, which is connected to a D.C. power supply and said second deflection blanking plate.

10. The deflection blanking circuit according to claim 5, wherein said amplifier comprises:

a transistor, an emitter of which is grounded;

a first resistor, one terminal of which is connected to a D.C. power supply;

a second resistor connected across a collector and base of said transistor;

a third resistor which is connected to an input terminal and said base of said transistor;

a fourth resistor which is connected to a D.C. power supply and said base of said transistor; and, wherein said collector of said transistor is connected to one plate of said two deflection blanking plates.

11. The deflection blanking circuit according to claim 5, wherein said amplifier is of a complementary and symmetrical type.

* * * * *